(12) United States Patent
Tamma et al.

(10) Patent No.: US 11,662,081 B2
(45) Date of Patent: May 30, 2023

(54) LED ARRAY WITH METALENS FOR ADAPTIVE LIGHTING

(71) Applicant: Lumileds LLC, San Jose, CA (US)

(72) Inventors: Venkata Ananth Tamma, San Jose, CA (US); Toni Lopez, Aachen (DE); Nicola Bettina Pfeffer, Eindhoven (NL); Marcel Rene Bohmer, Eindhoven (NL)

(73) Assignee: LUMILEDS LLC, San Jose, CA (US)

( * ) Notice: Subject to any disclaimer, the term of this patent is extended or adjusted under 35 U.S.C. 154(b) by 232 days.

(21) Appl. No.: 17/096,013

(22) Filed: Nov. 12, 2020

(65) Prior Publication Data
US 2022/0146079 A1 May 12, 2022

(51) Int. Cl.
| | |
|---|---|
| *F21V 14/06* | (2006.01) |
| *H04N 5/225* | (2006.01) |
| *G02B 27/01* | (2006.01) |
| *B82Y 20/00* | (2011.01) |

(52) U.S. Cl.
CPC .......... *F21V 14/06* (2013.01); *G02B 27/0172* (2013.01); *H04N 5/2256* (2013.01); *B82Y 20/00* (2013.01)

(58) Field of Classification Search
CPC .. F21V 14/06; G02B 27/0172; H04N 5/2256; B82Y 20/00
See application file for complete search history.

(56) References Cited

U.S. PATENT DOCUMENTS

| | | | | |
|---|---|---|---|---|
| 9,939,129 | B2* | 4/2018 | Byrnes | ................... G02B 27/30 |
| 10,132,465 | B2* | 11/2018 | Byrnes | ..................... F21K 9/64 |
| 10,408,419 | B2 | 9/2019 | Aieta et al. | |
| 11,204,153 | B1 | 12/2021 | Lopez et al. | |
| 11,508,888 | B2 | 11/2022 | Lopez et al. | |
| 2019/0064532 | A1 | 2/2019 | Riley, Jr. et al. | |
| 2019/0113727 | A1 | 4/2019 | Tamma | |
| 2019/0137762 | A1 | 5/2019 | Hu | |
| 2020/0081100 | A1 | 3/2020 | You et al. | |
| 2022/0102583 | A1* | 3/2022 | Baumheinrich | ...... H01L 27/156 |

FOREIGN PATENT DOCUMENTS

| | | |
|---|---|---|
| KR | 10-2019-0120040 A | 10/2019 |
| KR | 10-2020-0030432 A | 3/2020 |

OTHER PUBLICATIONS

From the Korean Intellectual Property Office as the ISA, "Notification of Transmittal of the International Search Report and the Written Opinion of the International Searching Authority, the the Declaration", PCT/US2021/057260, dated Feb. 23, 2022, 10 pages.

* cited by examiner

*Primary Examiner* — Tracie Y Green

(57) ABSTRACT

An adaptive lighting system comprises an array of independently controllable LEDs, and a metalens positioned to collimate, focus, or otherwise redirect light emitted by the array of LEDs. The adaptive lighting system may optionally include a pre-collimator positioned in the optical path between the array of LEDs and the metalens.

27 Claims, 6 Drawing Sheets

| S55 | S54 | S53 | S52 | S51 |
|---|---|---|---|---|
| S45 | S44 | S43 | S42 | S41 |
| S35 | S34 | S33 | S32 | S31 |
| S25 | S24 | S23 | S22 | S21 |
| S15 | S14 | S13 | S12 | S11 |

LED ARRAY WITH METALENS FOR ADAPTIVE LIGHTING

FIELD OF THE INVENTION

The present disclosure relates to adaptive illumination using light emitting diodes (LEDs) in combination with a metalens to provide adaptive light sources, for example for camera flash, virtual reality (VR), or augmented reality (AR) systems.

BACKGROUND

The term "light emitting diode" as used in this description is intended to include laser diodes (e.g., vertical cavity surface emitting lasers, VCSELs) as well as light emitting diodes that are not lasers. The high efficiency of LEDs compared to conventional filament lightbulbs and florescent lights as well as improved manufacturing capability has led to their vastly increased use in a wide range of lighting applications. The compact nature, low power, and controllability of LEDs has likewise led to their use as light sources in a variety of electronic devices such as cameras and smart phones.

SUMMARY

An adaptive lighting system comprises an array of independently controllable LEDs, and a metalens positioned to collimate, focus, or otherwise redirect light emitted by the array of LEDs. The adaptive lighting system may optionally include a pre-collimator positioned in the optical path between the array of LEDs and the metalens.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention.

An array of independently operable LEDs may be used in combination with a lens, lens system, or other optical system to provide adaptive illumination, that is, illumination that may be varied in intensity, color, direction, and/or spatial location depending for example on characteristics of objects or a scene to be illuminated. Such adaptive illumination is increasingly important for automotive, mobile device camera, VR, and AR applications. In these applications the dimensions, especially the height of the light source and associated optics (e.g., lenses), may be an important design parameter.

In mobile devices such as smart phones or tablets, it may be desirable to have cameras provide different fields of view, varying between 40° and 120° for instance for a smart phone. An adaptive illumination unit matching such a field of view should optimize light throughput while fitting into a limited volume. A lens used for such illumination does not need to have perfect imaging properties since resolution specifications are not as high as required for imaging applications. Efficiency is preferred over traditional imaging quality characteristic performance parameters such as those based on a modulation transfer functions.

This disclosure describes adaptive lighting systems comprising an LED array in combination with a metalens. As further described below, a metalens comprises a nanostructured surface (a metasurface) or a nanostructured structure (metastructure) designed to perform a lens-like function (e.g., act as a converging lens). Advantageously, a metalens may have a thin flat geometry, which facilitates a compact device design. The LED array may comprise independently operable discrete LEDs arranged as an array. Alternatively, the LED array may comprise one or more segmented monolithic LEDs in which the segments may be independently operable as LEDs. By "segmented monolithic LED" this disclosure refers to a monolithic semiconductor diode structure in which trenches passing partially but not entirely through the semiconductor diode structure define electrically isolated segments. The electrically isolated segments remain physically connected to each other by portions of the semiconductor structure.

Figures 1, 2:
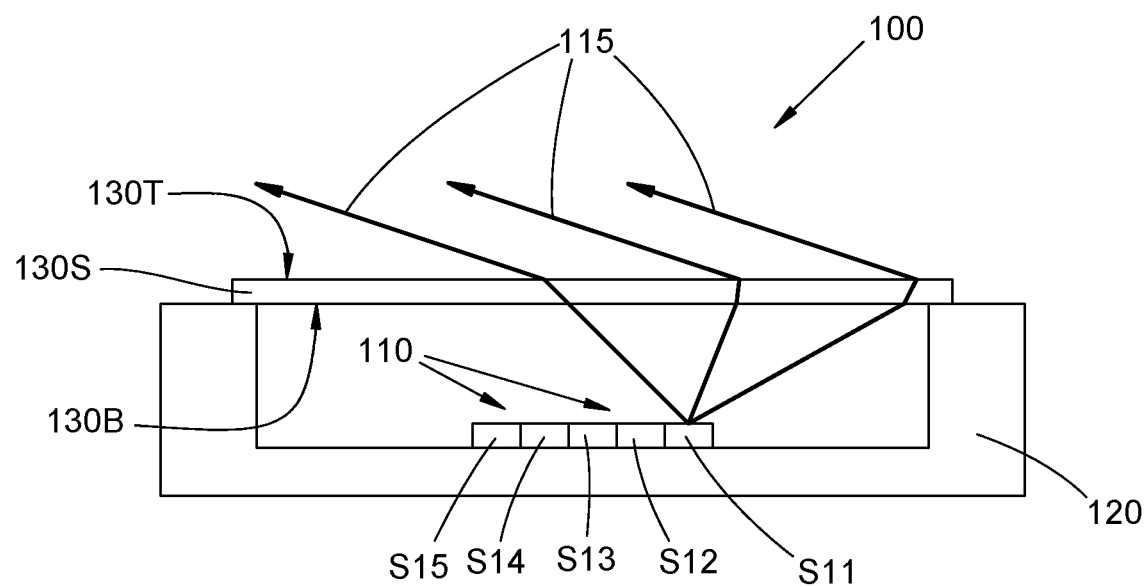
FIG. 1 shows a cross-sectional view of an example adaptive lighting system comprising an LED array and a metalens.
FIG. 2 shows a top view of the LED array in the example adaptive lighting system of FIG. 1.

FIG. 1 shows a cross-sectional view of an example adaptive lighting system 100 comprising an LED array 110 disposed in a housing 120. In the illustrated example LED array 110 is a monolithic LED device comprising independently operable LED segments S11, S12, S13, S14, and S15. A metalens 130 attached to housing 120 redirects (for example, collimates or focuses) light rays 115 emitted by the LED array. Adaptive lighting system 100 may provide illumination over a field of view of, for example, about 40° to about 80°, or to about 120°.

FIG. 2 shows a top view of LED array 110, which in this example comprises 25 independently operable LED segments arranged in a square 5×5 array and identified by their location in the array by row and column as S(row, column)

running from S11 to S55. More generally, LED array 110 may be for example a rectangular array or may approximate a non-rectangular (e.g., circular or oval) shape. Any suitable sized array may be used, for example a 3×3 array, a 5×5 array (as shown), a 7×7 array, or a 15×21 array. The LED segments in the array can be of the same size, or of different sizes. For example, the central segment could be chosen to be larger than peripheral segments. The array may have dimensions in the plane of the array of, for example, about 1.5 mm×1.5 mm to about 3 mm×3 mm.

The LED segments in array 110 may have dimensions in the plane of the array of, for example, about 5 microns to about 500 microns. The segments may be separated from their closest neighbors by, for example, 5 microns or more. The segments may be positioned within a distance of each other sufficient to both present a substantially uniform visual appearance and to provide a substantially uniform light beam. This distance can be selected so that the segments are separated by no more than a Rayleigh limit distance calculated for a user at a normal distance from the light source.

Each segment in LED array 110 may be a single color, with different segments emitting different colors (e.g., some segments emitting white light and other segments emitting red light). Different color segments can be interleaved. Segments of the same color may be grouped. Groups of one color of segment may be interleaved with groups of other colors. Independent operation of the segments allows the color of light emitted by the array to be tuned.

Each segment comprises a semiconductor light emitting diode, and optionally a wavelength converting structure that absorbs light emitted by the semiconducting light emitting diode and emits light of a longer wavelength. The semiconductor light emitting diodes maybe formed for example from II-VI, III-V, or other semiconductor material systems and may be configured to emit, for example, ultraviolet, visible, or infrared light, depending on the application.

The wavelength converting structures include one or more wavelength converting materials which may be, for example, conventional phosphors, ceramic phosphors, organic phosphors, quantum dots, organic semiconductors, II-VI or III-V semiconductors, II-VI or III-V semiconductor quantum dots or nanocrystals, dyes, polymers, or other materials that luminesce. Phosphor or other wavelength converting materials may be dispersed as luminescent particles in a binder material such as a silicone, for example, to form a wavelength converting structure. The wavelength converting structure may include light scattering or light diffusing elements, such as for example $TiO_2$. The wavelength converting structures may be a monolithic element covering multiple or all semiconductor light emitting diodes in an array, or may be structured into separate segments, each attached to a corresponding semiconductor light emitting diode. Gaps between these separate segments of the wavelength conversion structure may be filled with optically reflective material to confine light emission from each segment to this segment only.

In operation of adaptive lighting system 100, individual segments in LED array 110 may be operated to provide illumination adapted for a particular purpose. For example, adaptive lighting system 100 may provide illumination that varies by color and/or intensity across an illuminated scene or object and/or is aimed in a desired direction. A controller can be configured to receive data indicating locations and color characteristics of objects or persons in a scene and based on that information control LED array 110 to provide illumination adapted to the scene. Such data can be provided for example by an image sensor, or optical (e.g. laser scanning) or non-optical (e.g. millimeter radar) sensors.

For an application such as a flash, for example, the total emitted optical power of the LEDs may be, for example, about 0.1 W to about 10 W.

Referring again to FIG. 1, metalens 130 may be planar, as shown, and may have dimensions significantly larger than those of the LED array as measured in a plane parallel to the plane of the LED array. For example, metalens 130 may be 2 to 3 times the size of the LED array. The metalens is designed such that all light emitted from a specific LED segment in the LED array reaches a predefined region in the far field.

The field of view illuminated by adaptive lighting system 100 may be controlled by selecting the number and location of LEDs in array 110 that are operated to provide the illumination. In case a small field of view is needed, for instance 40°, only the central LED segments might be needed, while for a large field of view (for instance 120°) all LED segments could be switched on.

As noted above, metalens 130 is or comprises one or more metasurfaces or metastructures arranged so that metalens 130 functions as a lens, e.g., it focuses, collimates, or otherwise redirects rays of light incident on it from the LED array. Metalens 130 may function as a converging lens, for example. Metasurfaces are surfaces in which physical structure and/or chemical composition vary on a length scale that is typically less than a micron, i.e., they are nanostructured. Similarly, metastructures are structures in which physical structure and/or chemical composition vary on a length scale typically less than a micron. Metasurfaces and metastructures may be designed to provide particular optical functions and effects.

Metalens 130 comprises at least a first array of nano-scale antennas (nanoantennas) arranged, for example, as a metasurface in a plane parallel to the plane of the LED array. Each nanoantenna typically has dimensions in the plane of the array less than or equal to a free space wavelength of light emitted by the LED array. The nanoantennas have structural, chemical, and/or optical properties that vary with the spatial location of the nanoantennas to affect phase and amplitude of light emitted by the LED array through the metalens in a spatially varying manner that focuses, collimates, or otherwise redirects the light emitted by the LED array.

For example, the nanoantennas may be arranged to form nano-gratings in concentric rings about a central optical axis of the metalens. The width of each concentric ring in the plane of the metalens decreases as a function of radial distance from the central optical axis. Towards the outer edge of the metalens, the width of each ring can be for example in the range of 700 nm-1000 nm while towards the center of the metalens the width can be for example 1500 nm-5000 nm. The spacing between nanoantennas also changes as a function of the radial position with nanoantennas towards the edges arranged with a pitch of, for example, 220 nm-250 nm and nanoantennas toward the center arranged with a pitch is closer to 250 nm. That is, the pitch may decrease with increasing radial distance from the central axis.

The nanoantennas may be or comprise structures having pillar (nano-cylinder) shapes, for example. For example, metalens 130 may comprise one or more periodic arrays of pillars having diameters between for example about 80 nm and about 250 nm and heights between for example about 400 nm and 800 nm or between about 400 nm and 1 micron. The height is chosen as a design parameter to optimize system performance, chromatic aberration and efficiency. The pitch (center to center spacing) between rods may for be for example between 220 nm and 280 nm, which leaves a minimum gap between pillars of 30 nm. Such nanopillars may be arranged to form nano-gratings in concentric rings about a central optical axis of the metalens, as described above, with the long axes of the pillars arranged perpendicularly to the plane of the array.

Alternatively, the nanoantennas may be or comprise structures having fin shapes, for example. Such fin shaped nanoantennas (nanofins) may be for example similar in shape to pillars as described above but have flattened cross-sections perpendicular to their long axes. Such nanofins may be arranged similarly to the arrangements of nanopillars described above. A metalens comprising nanofins may be designed to be polarizing, that is, to preferentially transmit light of a particular linear polarization.

The height of the metalens can be reduced to the height of the nanoantennas (e.g., nanopillars or nanofins). This is substantially thinner than conventional imaging optics which typically have a thickness of 1 mm or more. For an imaging optic, such as a camera-flash lens, the periodic array may be disposed on a substrate that is spaced apart from the LED array. As noted above, for a camera flash lens the modulation transfer function may be less important than the illuminance which makes metalenses a suitable choice. Also, for a camera flash lens the requirement for chromatic aberration will be less stringent than for a true imaging application. The efficiency, however, will be an important parameter leading to large optics with highest possible numerical aperture (NA).

Figure 3:
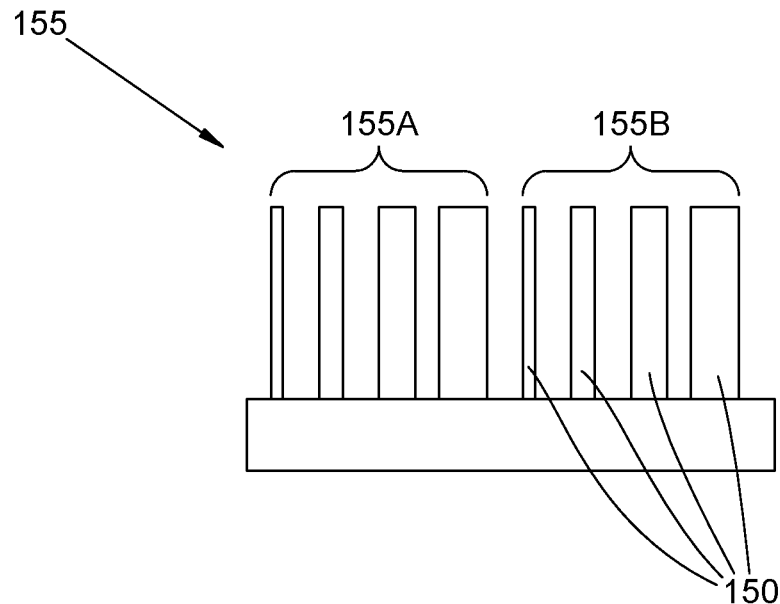
FIG. 3 shows an example of a possible arrangement of pillars (nano-cylinders) in an array of nanoantennas in a metasurface in a metalens, such as for example the metalens in the example adaptive lighting system of FIG. 1.

FIG. 3 shows an example of a possible arrangement of pillars 150 in an array of nanoantennas in a metasurface 155 in a metalens. Nanofins could be similarly arranged. The metasurface 155 is made up of a periodic arrangement of unit cells (e.g., 155A, 155B) with each unit cell comprising one or more pillars. In the simplest case, the unit cell consists of a single individual pillar. However, to improve color uniformity and to correct color aberration, the unit cell can consist of more than one pillar. For example, the unit cell can consist of three nanocylinders placed in a triangular lattice. Pillars within a unit cell can have cross-sections that are, for example, circular, elliptical, square, or rectangular.

Referring again to FIG. 1, in the illustrated example metalens 130 comprises a transparent substrate 130S (sapphire, for example) having a planar top surface 130T facing away from the LED array and a bottom surface 130B facing the LED array. An array of nanoantennas may be arranged as a metasurface on surface 130T, on surface 130B, or on surface 130T and on surface 130B to provide the desired lens function.

The placement of arrays of nanoantennas on both sides of the substrate can help with multiple aspects of the metalens design: 1) improving the efficiency by pre-collimating the incident light thereby increasing efficiency of the system by reducing the NA of the lens, and 2) improve the imaging system performance by offering avenues to correct aberration and color uniformity. Bending a beam at large angles is often less efficient than at lower angles. Having arrays of nanoantennas on both sides of the substrate may improve the efficiency, especially for the edges where large angles of deflection are needed.

In one variation, metalens 130 comprises arrays of nanoantennas on both sides 130T and 130B of the substrate near edges of the metalens where large deflection angles are needed, and an array of nanoantennas on only one side of the substrate (130T or 130B) in the central region of the metalens where the beam deflection is moderate.

To maximize efficiency an antireflective coating can be deposited on surfaces of substrate 130 on which there are no metastructures. For example, a porous low index layer or a multi-layer stack can be used to improve the incoupling of light. Other potential modifications include the deposition of a low index material in between the pillars to improve the mechanical robustness of the module. For a pure imaging optic, the recirculation of light should be avoided. Some recirculation for a flash lens could however be advantageous to increase efficiency. To this end additional scattering coatings can be applied.

Figure 4:
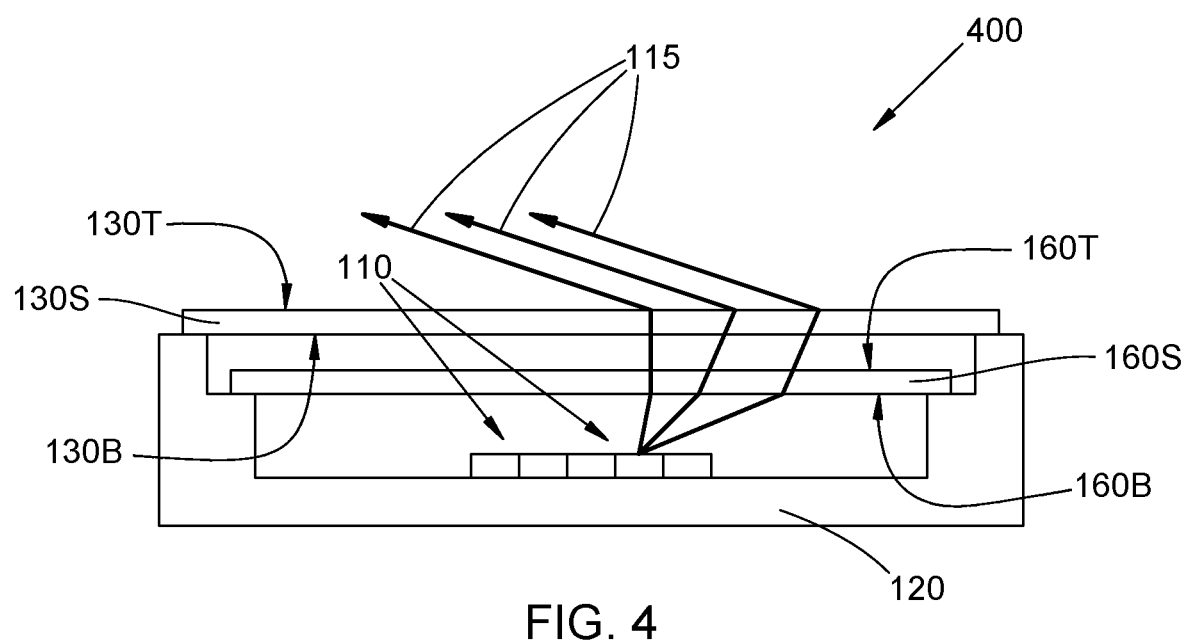
FIG. 4 shows a cross-sectional view of an example adaptive lighting system comprising an LED array, a pre-collimator, and a metalens.

Referring now to example adaptive lighting system 400 shown in FIG. 4, to further maximize efficiency a pre-collimator 160 may be added to the adaptive lighting system shown in FIG. 1. Pre-collimator 160 narrows down the angular emission of the LED array light source such that metalens 130 can be optimized and operate most effectively. This, in turn, should offer improvements in both power efficiency and light steering control, as well as a reduction in area of the lens up to 25%. Pre-collimator 160 may, for example, comprise a transparent substrate 160S (sapphire, for example) having a planar top surface 160T facing away from the LED array and a bottom surface 160B facing the LED array. An array of nanoantennas (pillars or fins as described above, for example) may be arranged as a metasurface on surface 160T, on surface 160B, or on surface 160T and on surface 130B to provide the desired pre-collimating function. Note that the overall thickness of adaptive lighting system 400 need not be greater than that of adaptive lighting system 100 of FIG. 1, provided that the target focal length distance without collimator is larger than the substrate thickness of the pre-collimator (neglecting metasurface thickness, i.e. <=1 um).

An important factor in obtaining high efficiency, low loss metalenses and pre-collimators is the choice of materials for the nanoantennas and the way they are prepared. Using materials that have a high refractive index and low absorptive loss improves performance. The refractive index and absorptive loss can depend on the way the material is prepared. Suitable materials for the nanoantennas may include, but are not limited to, niobium pentoxide, gallium nitride, silicon nitride, titanium dioxide, or hafnium oxide.

Metalenses as described herein are preferably prepared using sputtering (physical vapor deposition) or chemical vapor deposition to form a homogenous layer of the nanoantenna material. Gallium nitride (GaN), niobium pentoxide ($Nb_2O_5$), and silicon nitride are suitable materials to be used in this approach. For these materials immersion DUV, or alternatively nanoimprinting patterning techniques, can be subsequently used to pattern the layer to form nanoantenna arrays, followed by anisotropic etching in which a hard mask may be used to have a defined etch stop, leading to a well-defined layer thickness (e.g., pillar or fin height).

A less preferable approach is to write a pattern with e-beam lithography into a e-beam resist, and then subsequently fill the pattern with niobium pentoxide using atomic layer deposition (ALD). Due to the nature of the resist, the ALD can only be performed at low temperature and this has consequences for the refractive index of the material. It is known that niobium pentoxide prepared by ALD has a refractive index at 550 nm below 2.2, while bulk niobium pentoxide has a refractive index of 2.36. In contrast, niobium pentoxide formed by physical or chemical vapor deposition may have an index of refraction of 2.34 very close to the bulk value. This makes the sputtering approach preferable.

Further, with respect to losses by absorption the low temperature ALD growth approach is not optimal. Titanium Oxide ($TiO_2$) grown at 80° C. has an absorption (k) of about 0.004 and a refractive index of 2.37. For sputter-coated niobium pentoxide the refractive index is 2.34 as noted above and the absorption (k) is 0.0002, more than a factor of 10 lower than for titanium oxide, while the refractive index is similar. In addition, titanium oxide can be photocatalytic and may for that reason be disfavored. Also, for the ALD approach excess material must be etched away, there is no stop layer, and how much is etched just depends on the time, which leads to worse control over nanoantenna (e.g., pillar or fin) height.

Figure 5:
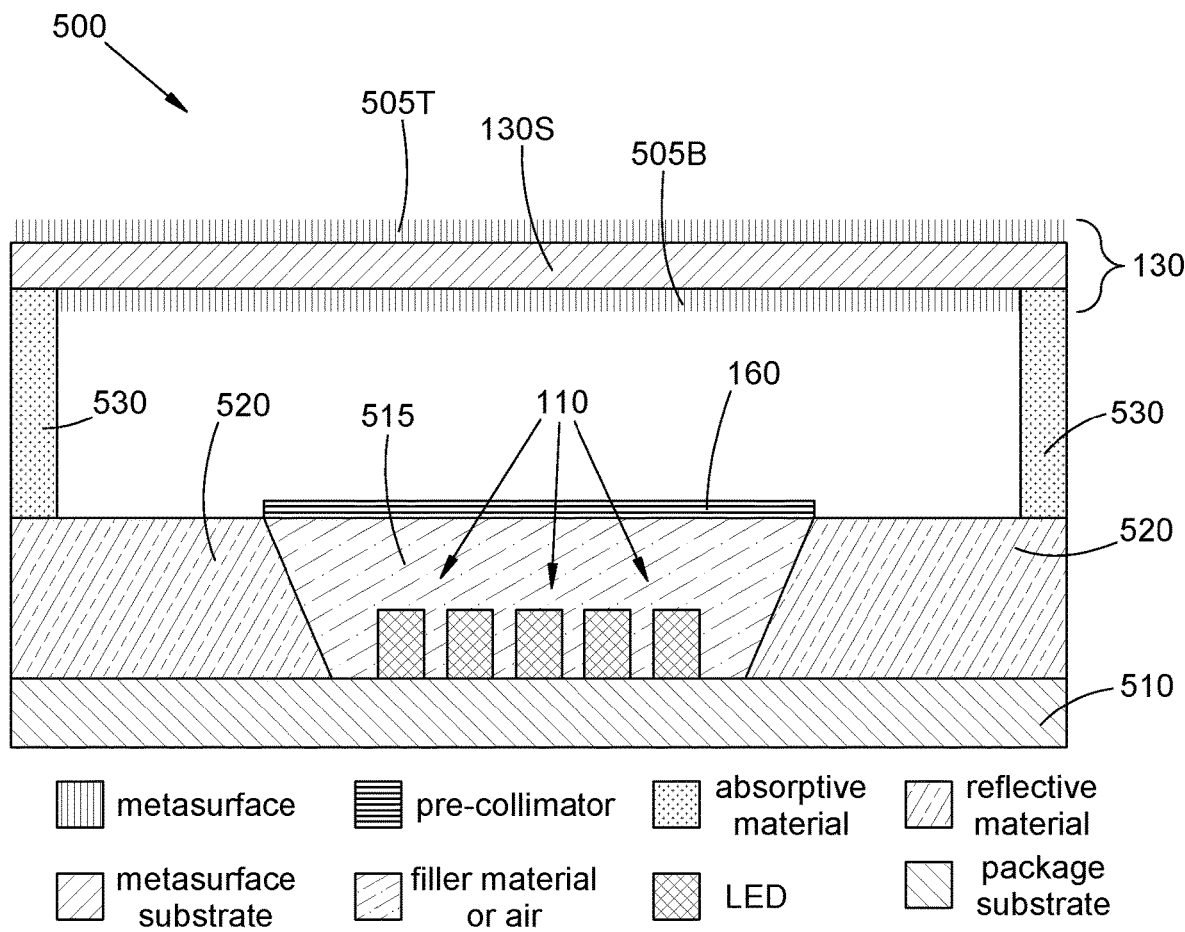
FIG. 5 shows a cross-sectional view of another example adaptive lighting system comprising an LED array, a pre-collimator, and a metalens.

FIG. 5 shows a cross-sectional view of an example adaptive lighting system 500 comprising an LED array 110, a pre-collimator 160, and a metalens 130. Metalens 130 comprises a metasurface 505T disposed on a top surface of a substrate 130S and a metasurface 505B disposed on a bottom surface of substrate 130S. LED array 110 is disposed on a substrate 510 in a cavity 515 defined by side reflectors 520 and pre-collimator 160. Side reflectors 520 may be formed from a volume reflective material such as, for example, titanium oxide particles dispersed in silicone. Side reflectors 520 may optionally be replaced by absorptive material if no light recycling is sought. The cavity may be filled with air or another transparent medium as filler material, for example a low index silicone or a nanoporous material. Metalens 130 is spaced apart from pre-collimator 160 by side walls 530, which may be absorptive.

Metalens metasurfaces 505T and 505B may comprise concentric rings of nanoantennas (e.g., pillars or fins), as described above, with the nanoantennas formed from niobium pentoxide as also described above. The pre-collimator may have a similar structure to the metalens, comprising for example niobium pentoxide pillars of, for example, radius 58 nm, height 250 nm, and period (pitch) 180 nm. The pre-collimator may alternatively be implemented as a multi-layered thin film coating/photonic crystal, or a photonic crystal consisting of nano-rods and nano-cones formed, for example, from niobium pentoxide and/or gallium nitride.

Figure 6:
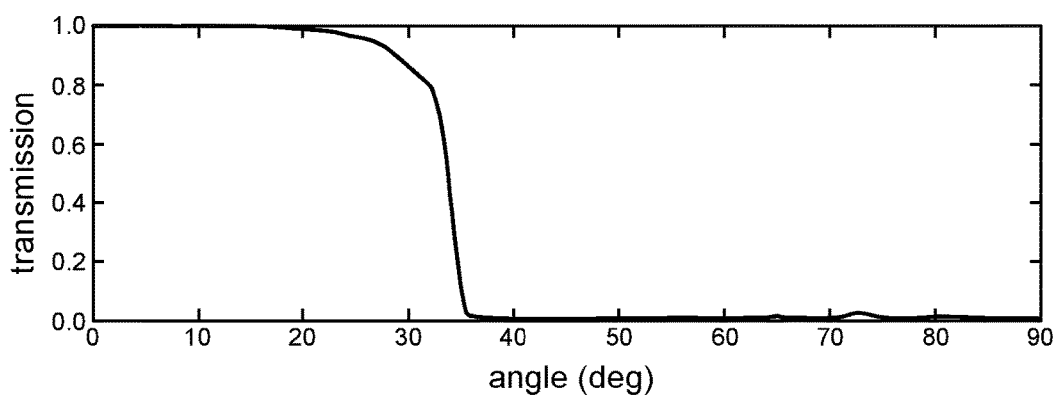
FIG. 6 shows a plot of calculated transmission versus angle of incidence for an example metalens.
Figure 7:
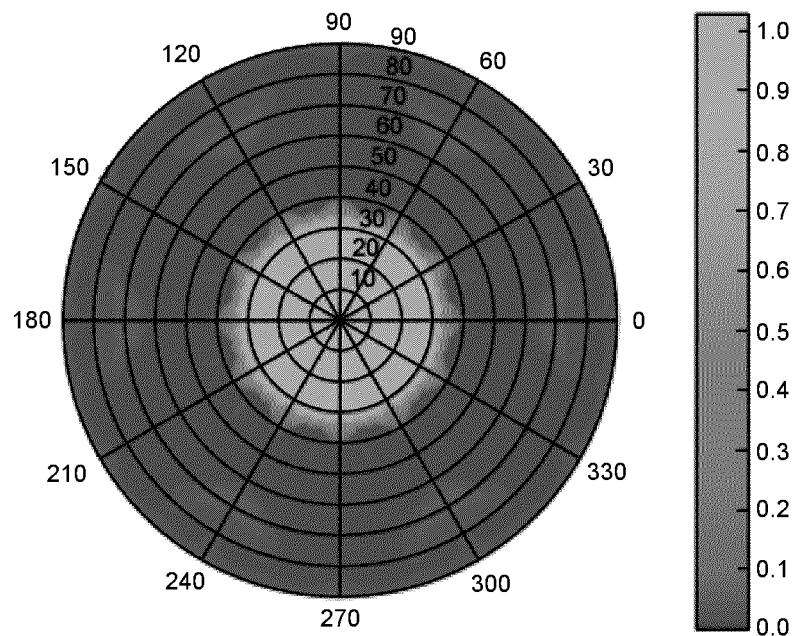
FIG. 7 shows another plot of calculated transmission versus angle of incidence for the example metalens of FIG. 6.
Figure 8:
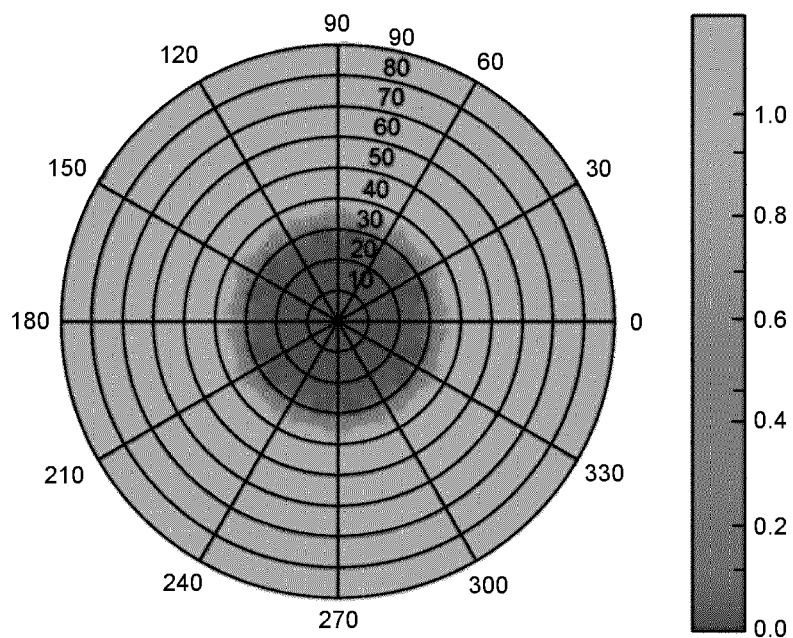
FIG. 8 shows a plot of reflectance as a function of angle of incidence for the example metalens of FIG. 6.

FIGS. 6 and 7 show plots of calculated transmission versus angle of incidence, for light having a wavelength of 450 nm, for the metalens in a system as in FIG. 5 with the metalens formed from niobium pentoxide pillars as described above. FIG. 8 similarly shows reflectance versus angle of incidence for the metalens, for light having a wavelength of 450 nm.

Figure 9:
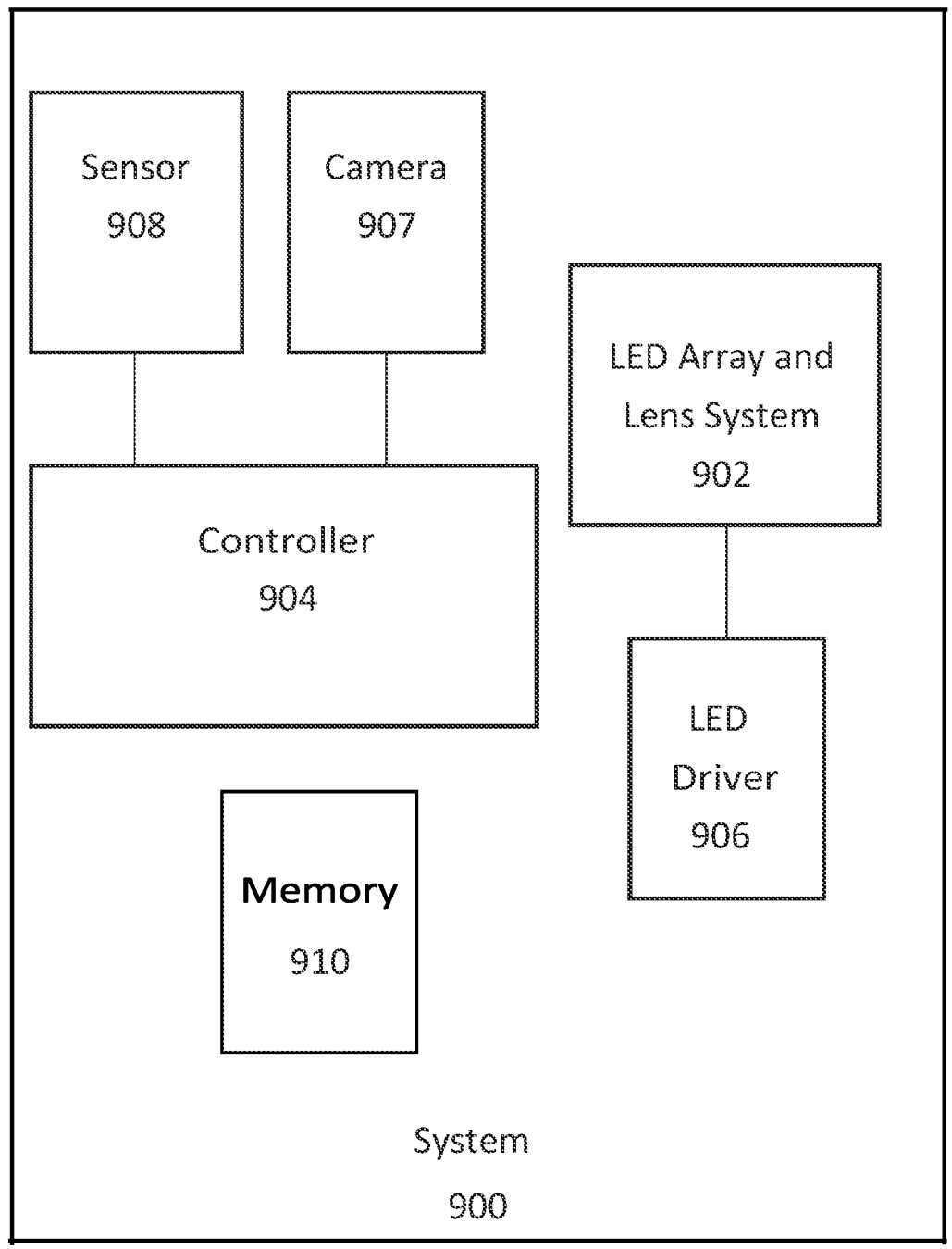
FIG. 9 schematically illustrates an example camera flash system comprising an adaptive illumination system.

FIG. 9 schematically illustrates an example camera flash system 900 comprising an LED array and metalens adaptive illumination system 902, which may be similar or identical to the systems described above. Flash system 900 also comprises an LED driver 906 that is controlled by a controller 904, such as a microprocessor. Controller 904 may also be coupled to a camera 907 and to sensors 908, and operate in accordance with instructions and profiles stored in memory 910. Camera 907 and adaptive illumination system 902 may be controlled by controller 904 to match their fields of view.

Sensors 908 may include, for example, positional sensors (e.g., a gyroscope and/or accelerometer) and/or other sensors that may be used to determine the position, speed, and orientation of system 900. The signals from the sensors 908 may be supplied to the controller 904 to be used to determine the appropriate course of action of the controller 904 (e.g., which LEDs are currently illuminating a target and which LEDs will be illuminating the target a predetermined amount of time later).

In operation, illumination from some or all of the pixels of the LED array in 902 may be adjusted—deactivated, operated at full intensity, or operated at an intermediate intensity. As noted above, beam focus or steering of light emitted by the LED array in 902 can be performed electronically by activating one or more subsets of the pixels, to permit dynamic adjustment of the beam shape without moving optics or changing the focus of the lens in the lighting apparatus.

Adaptive light emitting matrix pixel arrays and lens systems such as described herein may support various other beam steering or other applications that benefit from fine-grained intensity, spatial, and temporal control of light distribution. These applications may include, but are not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. Associated optics may be distinct at a pixel, pixel block, or device level. An example light emitting pixel array may include a device having a commonly controlled central block of high intensity pixels with an associated common optic, whereas edge pixels may have individual optics. In addition to flashlights, common applications supported by light emitting pixel arrays include video lighting, automotive headlights, architectural and area illumination, and street lighting.

Figure 10:
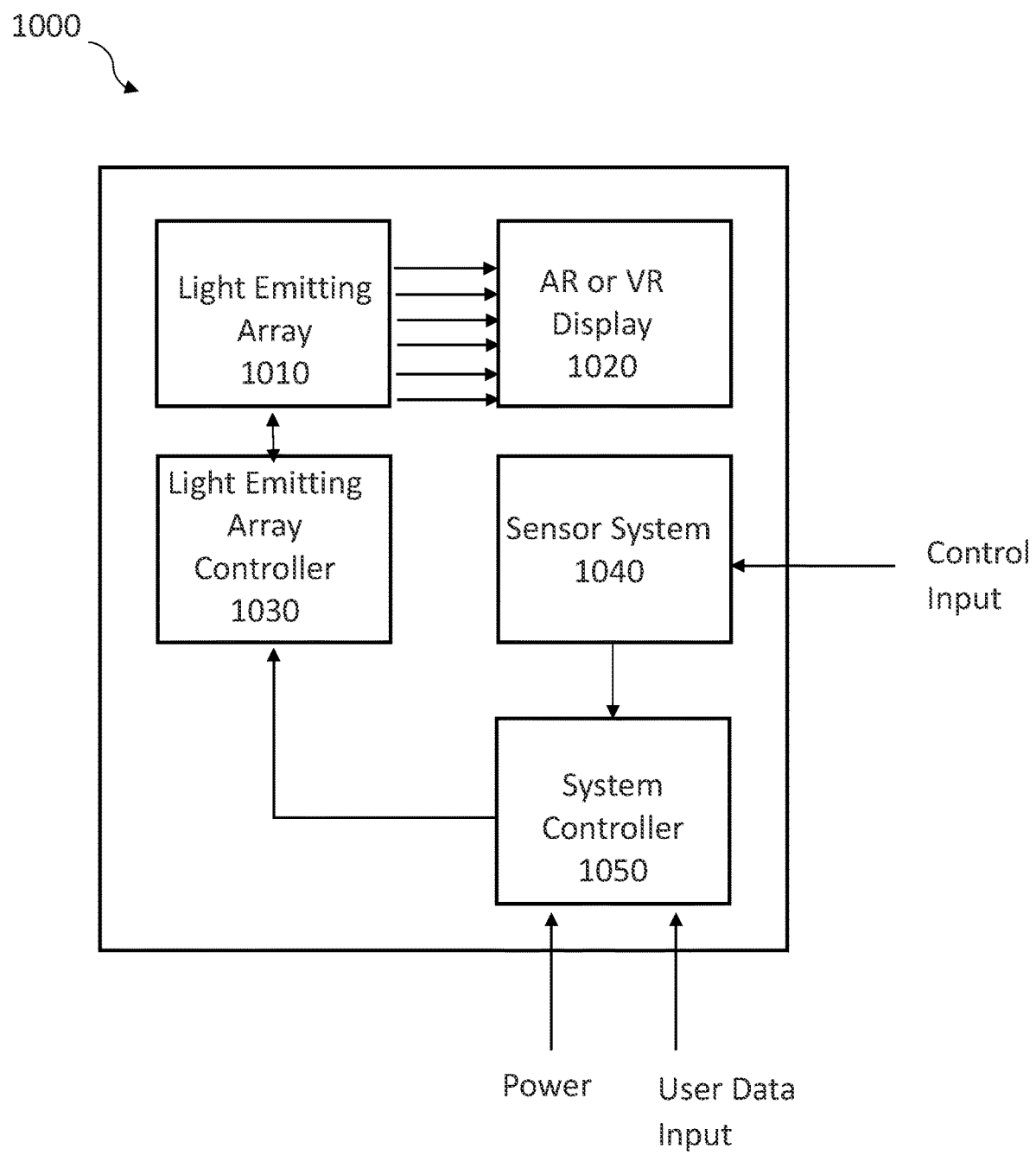
FIG. 10 schematically illustrates an example AR/VR system that includes an adaptive illumination system.

Applications supported by the described adaptive light emitting pixel arrays include augmented (AR) or virtual reality (VR) headsets, glasses, or projectors. For example, FIG. 10 schematically illustrates an example AR/VR system 1000 that includes an adaptive light emitting array 1010, AR or VR display 1020, a light emitting array controller 1030, sensor system 1040, and system controller 1050. Control input is provided to the sensor system 1040, while power and user data input is provided to the system controller 1050. As will be understood, in some embodiments modules included in the AR/VR system 1000 can be compactly arranged in a single structure, or one or more elements can be separately mounted and connected via wireless or wired communication. For example, the light emitting array 1010, AR or VR display 1020, and sensor system 1040 can be mounted on a headset or glasses, with the light emitting controller and/or system controller 1050 separately mounted.

In one embodiment, the light emitting array 1010 includes one or more adaptive light emitting arrays, as described above for example, that can be used to project light in graphical or object patterns that can support AR/VR systems. In some embodiments, arrays of microLEDs (µLEDs or uLEDs) can be used. MicroLEDs can support high density pixels having a lateral dimension less than 100 µm by 100 µm. In some embodiments, microLEDs with dimensions of about 50 µm in diameter or width and smaller can be used. Such microLEDs can be used for the manufacture of color displays by aligning in close proximity microLEDs comprising red, blue and green wavelengths. In other embodiments, microLEDs can be defined on a monolithic GaN or other semiconductor substrate, formed on segmented, partially, or fully divided semiconductor substrate, or individually formed or panel assembled as groupings of microLEDs. In some embodiments, the light emitting array 1010 can include small numbers of microLEDs positioned on substrates that are centimeter scale area or greater. In some embodiments, the light emitting array 1010 can support microLED pixel arrays with hundreds, thousands, or millions of light emitting LEDs positioned together on centimeter scale area substrates or smaller. In some embodiments, microLEDs can include light emitting diodes sized between 30 microns and 500 microns. The light emitting array(s) 1010 can be monochromatic, RGB, or other desired chromaticity. In some embodiments, pixels can be square, rectangular, hexagonal, or have curved perimeter. Pixels can be of the same size, of differing sizes, or similarly sized and grouped to present larger effective pixel size. In some embodiments, separate light emitting arrays can be used to provide display images, with AR features being provided by a distinct and separate micro-LED array. In some embodiments, a selected group of pixels can be used for displaying content to the user while tracking pixels can be used for providing tracking light used in eye tracking. Content display pixels are designed to emit visible light, with at least some portion of the visible band (approximately 400 nm to 750 nm). In contrast, tracking pixels can emit light in visible band or in the IR band (approximately 750 nm to 2,200 nm), or some combination thereof. As an alternative example, the tracking pixels could operate in the 800 to 1000 nanometer range. In some embodiments, the tracking pixels can emit tracking light during a time period that content pixels are turned off and are not displaying content to the user.

As will be understood, in some embodiments light emitting pixels and circuitry supporting light emitting array 1010 can be packaged and optionally include a submount or printed circuit board connected for powering and controlling light production by semiconductor LEDs. In certain embodiments, a printed circuit board supporting light emitting array 1010 can also include electrical vias, heat sinks, ground planes, electrical traces, and flip chip or other mounting systems. The submount or printed circuit board may be formed of any suitable material, such as ceramic, silicon, aluminum, etc. If the submount material is conductive, an insulating layer is formed over the substrate material, and the metal electrode pattern is formed over the insulating layer. The submount can act as a mechanical support, providing an electrical interface between electrodes on the light emitting array 1010 and a power supply, and also provide heat sink functionality.

The AR/VR system 1000 can incorporate a wide range of optics in adaptive light emitting array 1010 and/or AR/VR display 1020, for example to couple light emitted by adaptive light emitting array 1010 into AR/VR display 1020. Such optical elements can include for example metalenses and pre-collimators as described above for example. For AR/VR applications the metalenses and pre-collimators may comprise nanofins as described above and be designed to polarize the light they transmit. Optical elements can also or alternatively include apertures, filters, a Fresnel lens, a convex lens, a concave lens, or any other suitable optical element that affects the projected light from the light emitting array 1010. Additionally, one or more of the optical elements can have one or more coatings, including UV blocking or anti-reflective coatings. In some embodiments optics can be used to correct or minimize two-or three dimensional optical errors including pincushion distortion, barrel distortion, longitudinal chromatic aberration, spherical aberration, chromatic aberration, field curvature, astigmatism, or any other type of optical error. In some embodiments, optical elements can be used to magnify and/or correct images. Advantageously, in some embodiments magnification of display images allows the light emitting array 1010 to be physically smaller, of less weight, and require less power than larger displays. Additionally, magnification can increase a field of view of the displayed content allowing display presentation equals a user's normal field of view.

In one embodiment, the light emitting array controller 1030 can be used to provide power and real time control for the light emitting array 1010. For example, the light emitting array controller 1030 can be able to implement pixel or group pixel level control of amplitude and duty cycle. In some embodiments the light emitting array controller 1030 further includes a frame buffer for holding generated or processed images that can be supplied to the light emitting array 1010. Other supported modules can include digital control interfaces such as Inter-Integrated Circuit (I2C) serial bus, Serial Peripheral Interface (SPI), USB-C, HDMI, Display Port, or other suitable image or control modules that are configured to transmit needed image data, control data or instructions.

In operation, pixels in the images can be used to define response of corresponding light emitting array 1010, with intensity and spatial modulation of LED pixels being based on the image(s). To reduce data rate issues, groups of pixels (e.g. 5×5 blocks) can be controlled as single blocks in some embodiments. In some embodiments, high speed and high data rate operation is supported, with pixel values from successive images able to be loaded as successive frames in an image sequence at a rate between 30 Hz and 100 Hz, with 60 Hz being typical. Pulse width modulation can be used to control each pixel to emit light in a pattern and with an intensity at least partially dependent on the image.

In some embodiments, the sensor system 1040 can include external sensors such as cameras, depth sensors, or audio sensors that monitor the environment, and internal sensors such as accelerometers or two or three axis gyroscopes that monitor AR/VR headset position. Other sensors can include but are not limited to air pressure, stress sensors, temperature sensors, or any other suitable sensors needed for local or remote environmental monitoring. In some embodiments, control input can include detected touch or taps, gestural input, or control based on headset or display position. As another example, based on the one or more measurement signals from one or more gyroscope or position sensors that measure translation or rotational movement, an estimated position of AR/VR system 1000 relative to an initial position can be determined.

In some embodiments, the system controller 1050 uses data from the sensor system 1040 to integrate measurement signals received from the accelerometers over time to estimate a velocity vector and integrate the velocity vector over time to determine an estimated position of a reference point for the AR/VR system 1000. In other embodiments, the reference point used to describe the position of the AR/VR system 1000 can be based on depth sensor, camera positioning views, or optical field flow.

Based on changes in position, orientation, or movement of the AR/VR system1000, the system controller 1050 can send images or instructions the light emitting array controller 1030. Changes or modification the images or instructions can also be made by user data input, or automated data input as needed. User data input can include but is not limited to that provided by audio instructions, haptic feedback, eye or pupil positioning, or connected keyboard, mouse, or game controller.

This disclosure is illustrative and not limiting. Further modifications will be apparent to one skilled in the art in light of this disclosure and are intended to fall within the scope of the appended claims.

What is claimed is:

1. An adaptive illumination system comprising:
an array of independently controllable LEDs;
a pre-collimator arranged to partially collimate light emitted by the LEDs; and
a metalens positioned on an opposite side of the pre-collimator from the LEDs and comprising at least a first array of niobium pentoxide nanoantennas arranged to affect phase and amplitude of the light partially collimated by the pre-collimator to further collimate the light,
the metalens being positioned and structurally arranged so that light emitted from different LEDs of the array is directed to corresponding differing predefined far-field regions.

2. The adaptive illumination system of claim 1, wherein each LED is a segment of a monolithic structure.

3. The adaptive illumination system of claim 2, wherein each LED has dimensions in a plane of the array of less than or equal to 500 microns.

4. The adaptive illumination system of claim 3, wherein each LED has dimensions in the plane of the array of less than or equal to 100 microns.

5. The adaptive illumination system of claim 1, wherein the pre-collimator comprises an array of nanoantennas arranged to affect phase and amplitude of the light emitted by the LEDs to partially collimate the light.

6. The adaptive illumination system of claim 5, wherein the nanoantennas in the pre-collimator are formed from niobium pentoxide, gallium nitride, silicon nitride, titanium dioxide, or hafnium oxide.

7. The adaptive illumination system of claim 6, wherein the nanoantennas in the pre-collimator are formed from niobium pentoxide.

8. The adaptive illumination system of claim 1, wherein the metalens comprises a substrate, and the first array of niobium pentoxide nanoantennas is arranged on a first surface of the substrate.

9. The adaptive illumination system of claim 8, comprising a second array of niobium pentoxide nanoantennas arranged to affect phase and amplitude of the light partially collimated by the pre-collimator to further collimate the light, the second array of niobium pentoxide nanoantennas arranged on a second surface of the substrate opposite from the first surface of the substrate.

10. The adaptive illumination system of claim 1, wherein the niobium pentoxide nanoantennas have cylindrical shapes and are arranged with their long axes perpendicular to a plane of the metalens.

11. The adaptive light illumination system of claim 1, wherein each LED is a segment of a monolithic structure, the metalens comprises a substrate, and the first array of niobium pentoxide nanoantennas is arranged on a first surface of the substrate, comprising a second array of niobium pentoxide nanoantennas arranged to affect phase and amplitude of the light partially collimated by the pre-collimator to further collimate the light, the second array of niobium pentoxide nanoantennas arranged on a second surface of the substrate opposite from the first surface of the substrate.

12. An adaptive illumination system comprising:
an array of independently controllable LEDs; and
a metalens spaced apart from the array of LEDs and comprising:
a substrate;
a first array of niobium pentoxide nanoantennas arranged on a first surface of the substrate to affect phase and amplitude of light emitted by the LEDs to partially collimated the light; and
a second array of niobium pentoxide nanoantennas arranged on a second surface of the substrate opposite from the first surface to affect phase and amplitude of light emitted by the LEDs to further collimate the light,
the metalens being positioned and structurally arranged so that light emitted from different LEDs of the array is directed to corresponding differing predefined far-field regions.

13. An adaptive illumination system comprising:
an array of independently controllable LEDs; and
a metalens spaced apart from the array of LEDs, the metalens comprising:
a substrate;
a first array of niobium pentoxide nanoantennas arranged on a first surface of the substrate to affect phase and amplitude of light emitted by the LEDs to partially collimated the light; and
a second array of niobium pentoxide nanoantennas arranged on a second surface of the substrate opposite from the first surface to affect phase and amplitude of light emitted by the LEDs to further collimate the light,
wherein:
both the first and the second array of niobium pentoxide nanoantennas extend to outer portions of the metalens;
the first array of niobium pentoxide nanoantennas covers central regions of the metalens around an optical axis of the metalens; and
the second array of niobium pentoxide nanoantennas does not cover the central region of the metalens.

14. The adaptive illumination system of claim 13, wherein each LED is a segment of a monolithic structure.

15. The adaptive illumination system of claim 14, wherein each LED has dimensions in a plane of the array of less than or equal to 500 microns.

16. The adaptive illumination system of claim 15, wherein each LED has dimensions in the plane of the array of less than or equal to 100 microns.

17. The adaptive illumination system of claim 12, wherein the niobium pentoxide nanoantennas have cylindrical shapes and are arranged with their long axes perpendicular to a plane of the metalens.

18. A mobile device comprising:
a camera;
a flash illumination system comprising:
a monolithic array of independently controllable LEDs;
a metalens spaced apart from the array of LEDs and comprising at least a first array of niobium pentoxide nanoantennas arranged to affect phase and amplitude of light emitted by the LEDs to at least partially collimate the light, the metalens being positioned and structurally arranged so that light emitted from different LEDs of the array is directed to corresponding differing predefined far-field regions; and
a controller configured to operate the LEDs to match a field of view of the flash illumination system to a field of view of the camera.

19. The mobile device of claim 18, wherein each LED has dimensions in a plane of the array of less than or equal to 500 microns.

20. The mobile device of claim 18, wherein the metalens comprises a substrate, and the first array of niobium pentoxide nanoantennas is arranged on a first surface of the substrate.

21. The mobile device of claim 20, comprising a second array of niobium pentoxide nanoantennas arranged to affect phase and amplitude of the light emitted by the LEDs to at least partially collimate the light, the second array of niobium pentoxide nanoantennas arranged on a second surface of the substrate opposite from the first surface of the substrate.

22. The mobile device of claim 18, comprising a pre-collimator positioned between the LED array and the metalens in an optical path of light emitted by the array of LEDs.

23. A display system comprising:
   a display;
   a monolithic array of independently controllable LEDs; and
   a metalens spaced apart from the array of LEDs and arranged to couple light from the array of LEDs into the display, the metalens comprising at least a first array of niobium pentoxide nanoantennas arranged to affect phase and amplitude of light emitted by the LEDs to at least partially collimate the light, the metalens being positioned and structurally arranged so that light emitted from different LEDs of the array is directed to corresponding differing predefined far-field regions.

24. The display system of claim 23, wherein each LED has dimensions in a plane of the array of less than or equal to 100 microns.

25. The display system of claim 23, wherein the metalens comprises a substrate, and the first array of niobium pentoxide nanoantennas is arranged on a first surface of the substrate.

26. The display system of claim 25, comprising a second array of niobium pentoxide nanoantennas arranged to affect phase and amplitude of the light emitted by the LEDs to at least partially collimate the light, the second array of niobium pentoxide nanoantennas arranged on a second surface of the substrate opposite from the first surface of the substrate.

27. The display system of claim 23, comprising a pre-collimator positioned between the LED array and the metalens in an optical path of light emitted by the array of LEDs.

\* \* \* \* \*